United States Patent [19]

Wood, Jr.

[11] 4,085,536
[45] Apr. 25, 1978

[54] AUTOMATIC FISHING DEVICE

[76] Inventor: Everett J. Wood, Jr., Rte. No. 2, Box 342, Hillman, Mich. 49746

[21] Appl. No.: 750,290

[22] Filed: Dec. 13, 1976

[51] Int. Cl.² ............................................. A01K 97/00
[52] U.S. Cl. ...................................... 43/15; 43/44.93
[58] Field of Search ........................... 43/15, 16, 44.93

[56] References Cited

U.S. PATENT DOCUMENTS

| 279,556 | 6/1883 | Fisher | 43/15 |
|---|---|---|---|
| 2,177,912 | 10/1939 | Spitz et al. | 43/15 |
| 3,007,275 | 11/1961 | Standley | 43/15 |
| 3,030,726 | 4/1962 | Knapton | 43/44.93 |

Primary Examiner—Robert E. Bagwill
Assistant Examiner—Daniel J. Leach

[57] ABSTRACT

An automatic fishing device, which includes a support, a fishing rod, a spring for holding the fishing rod in a predetermined first angular position relative to the support, and trigger apparatus for holding the fishing rod in a different position against the resilient force of the spring. The trigger apparatus includes a trigger member having a notch and which is one end of the spring. A stopper is slidably positioned on the fishing line so as to engage the notch when the fishing line is passed through the notch and so as to hold the fishing rod against resilient forces of the spring through tension in the fishing line.

8 Claims, 8 Drawing Figures

AUTOMATIC FISHING DEVICE

BACKGROUND OF THE INVENTION

Automatic fishing devices have been in common usage for many years. Such devices generally provide the two functions of setting a fish hook in the mouth of a fish and notification to the fisherman that a fish has taken the bait.

Automatic fishing devices may be designed for use in fair weather, such as that disclosed in Hamrick U.S. Pat. No. 2,918,746, a United States Patent issued Dec. 29, 1959. Other automatic fishing devices are adapted for use in winter weather. Such devices are commonly called "Tip-ups" and are designed to be used on a flat frozen surface of a lake. An automatic fishing device designed for use in fair weather may be totally unsuitable for use on a frozen lake. For example, the design of Hamrick, U.S. Pat. No. 2,918,746, could not be easily moved between winter fishing locations for the reason that it is supported by a single shaft which could not be readily inserted in frozen ground or ice.

It is therefore an object of this invention to provide an automatic fishing device which is readily moveable between fishing locations.

It is another object of this invention to provide an automatic fishing device which is portable, folds to a small package, is simple of design, and of inexpensive construction.

It is yet another object of this invention to provide an automatic fishing device which employs a trigger mechanism using a stopper that is easily positioned at an infinite number of points on a fishing line, which is passed through a notch in the apparatus so as to hold the fishing rod against resilient forces of a spring until the fishing line is disengaged from the notch by the pull of a fish on the fishing line.

The foregoing and other objects and advantages of the subject invention will become apparent from the accompanying drawings and following descriptions.

SUMMARY OF THE INVENTION

This invention is of a unique automatic fishing device which employs a single spring having a single coil and two elongated ends, one being secured to a support and the other supporting the fishing rod. The spring end secured to the support contains a notch through which the fishing line is passed. A stopper which may be securely attached to the fishing line at an infinite number of points prevents pulling of the fishing line through the notch by the spring moving the fishing rod. The stopper includes two truncated substantially conical concentric members between which the fishing line is wedged to securely hold the stopper at a predetermined position on the fishing line.

DESCRIPTION OF THE DRAWINGS

This invention will be better understood from the following description in conjunction with the accompanying drawings, in which.

DESCRIPTION OF THE PREFERRED EMBODIMENT

Figure 1:
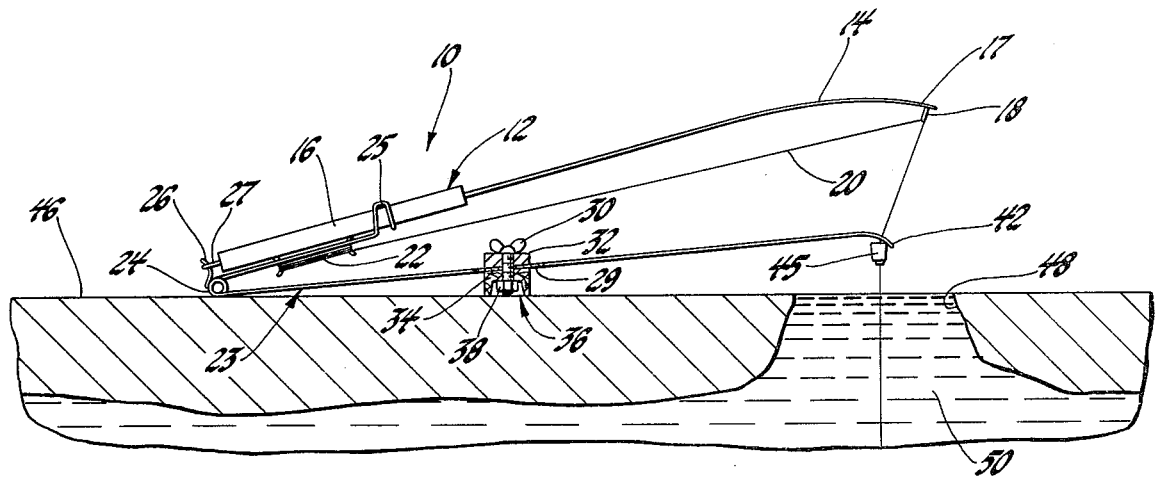
FIG. 1 is a side elevational view of the subject invention.

As shown in FIG. 1, an automatic fishing device generally indicated by the numeral 10 includes a fishing rod 12 having a flexible shaft 14 embedded in a solid wood handle 16. The tip 17 of the fishing rod 12 contains a single eyelet 18. A fishing line 20 is wound on a hanger 22 on the handle 16 and extends through the eyelet 18.

The fishing rod 12 is supported by a spring 23 in which is formed a single loop 24 and a hook 25 for supporting the handle 16. A stud 26 on the loop 24 is engaged by a screw eye 27 embedded in the butt 28 of the handle 16 of the fishing rod 12.

A flattened section 29 of the spring 23 is provided. A wing bolt 30 extends through a metal washer 32 and a hole in the flattened section 29 and a hole in an elongated wood support 34. The support 34 contains a recess 36 in which a nut 38 engages the threads of the wing bolt 30.

An elongated section 40 of the spring 23 extends beyond the support 34 to form a trigger fashioned from a flattened end 42 of the spring 23. The flattened end 42 contains a notch 44. In the position shown in FIG. 1, the fishing line 20 is passed through the notch 44 in the flattened end 42 of the spring 23.

A stopper 45 is secured to the fishing line 20 so as to prevent sliding the fishing line 20 through the notch 44.

In the illustrated embodiment the automatic fishing device 10 is sitting on the frozen surface 46 of a lake. A hole 48 is cut in the frozen surface 46 and the fishing line 20 extends through the hole 48 into the water 50 below the frozen surface 46.

Figure 2:
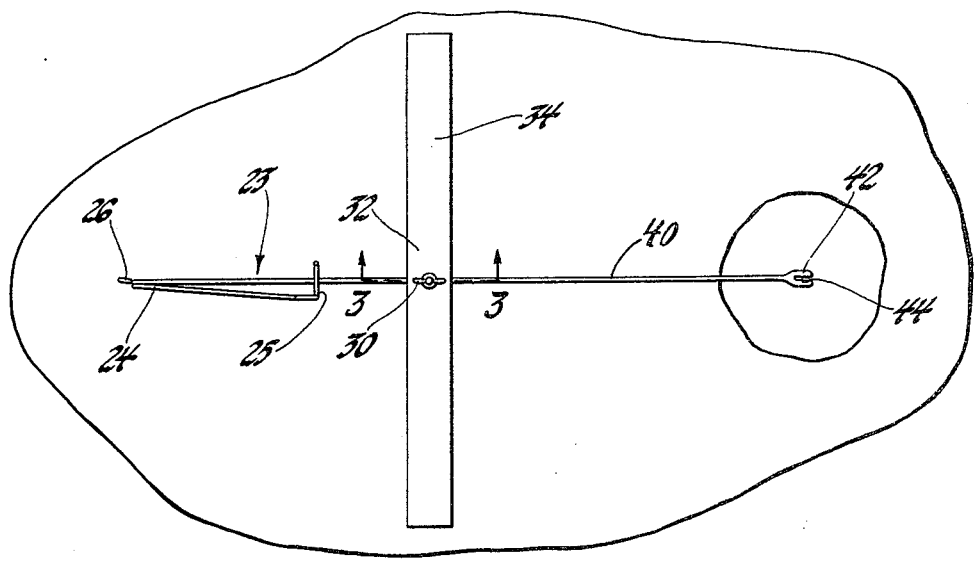
FIG. 2 is a plan view of the subject invention without the fishing rod.

As shown in FIG. 2, with the fishing rod 12 removed the hook 25 in the spring 23 is positioned so the fishing rod 12 normally rests directly above the elongated section 40 of the spring 23.

Figure 3:
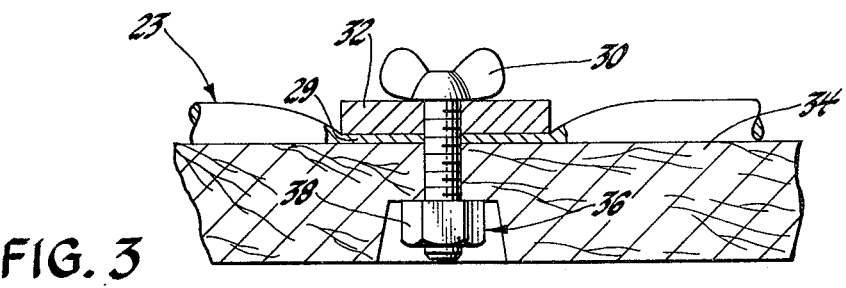
FIG. 3 is an enlarged section taken along the line 3 — 3 shown in FIG. 2.

As shown in FIG. 3, when the wing bolt 30 is loosened from the nut 38 the support 34 may be turned to align with the spring 23 to facilitate easy carrying of the automatic fishing device 10.

Figure 4:
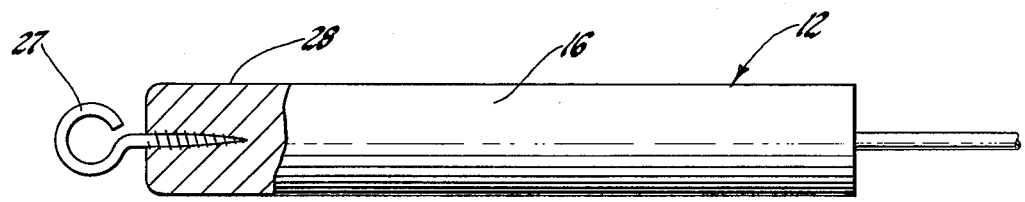
FIG. 4 is an enlarged detail of a portion of the fishing rod handle showing connecting means between the handle and the spring assembly.

As shown in FIG. 4, a conventional screw eye 27 embedded in the handle 16 of the fishing rod 12 is sufficient to engage the stud 26 to support the fishing rod 12.

Figure 5:
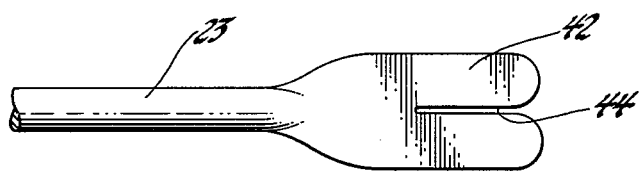
FIG. 5 is an enlarged portion of the trigger member.

As shown in FIG. 5, the trigger of the subject apparatus is provided by simply flattening the spring 23 and cutting a notch 44 in same.

Figure 6:
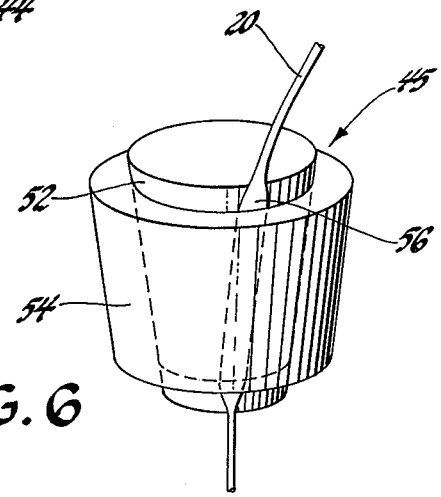
FIG. 6 is an enlarged perspective of the stopper.

As shown in FIG. 6, the stopper 45 in the preferred embodiment is comprised of two concentric truncated cones, being an inner cone 52 and an outer cone 54 between which the fishing line 20 is wedged and flattened slightly as at 56. As persons versed in the art will appreciate, the design of the stopper 45 permits separating the inner cone 52 from the outer cone 54 by pressing them apart. The stopper 45 can then be slid to an infinite number of points on the fishing line 20. The stopper 45 may be again secured to the fishing line 20 by sliding the inner cone 52 and outer cone 54 in opposite directions along their common axis so as to wedge the fishing line 20 tightly between them.

Figure 7:
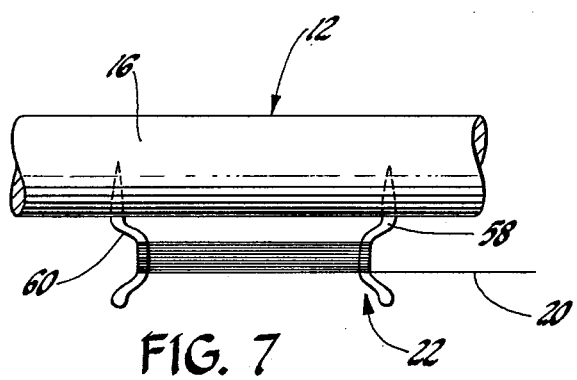
FIG. 7 is an enlarged elevational view of the fishing line hanger on the fishing rod.

As shown in FIG. 7, the hanger 22 for the fishing line 20 on the fishing rod 12 may be of any standard construction and, indeed, may consist of simply two wires 58 and 60 embedded in the handle 16 of the fishing rod 12.

Figure 8:
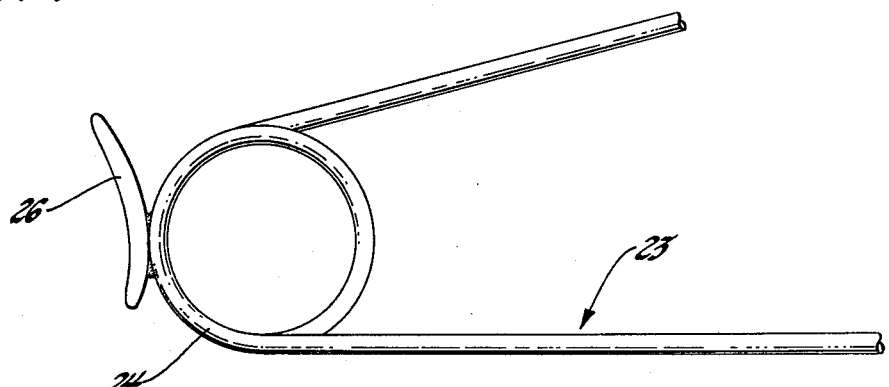
FIG. 8 is an enlarged elevational view of a portion of the spring.

As shown in FIG. 8, the illustrated embodiment of the subject invention provides for a single loop 24 in the spring 23. The loop 24 provides a resilient section between the first elongated end of the spring 23 which is secured to the support 34 and the second elongated end of the spring 23 which is secured to the fishing rod 12.

The operation of the subject automatic fishing device 12 is as follows:

When the fishing rod 12 is placed in the hook 25 and the screw eye 27 engages the stud 26 the fishing rod 12 is at rest and the shaft 14 is straight. The spring 23 holds the fishing rod 12 in predetermined angular position relative to the elongated section 40 of the spring 23 which is secured to the support 34.

To set the automatic fishing device 10 the fishing line 20 is extended in the general direction where fish are expected to be encountered, which in the illustrated embodiment is through the hole 48. The automatic fishing device 10 is set to be triggered by positioning the stopper 45 on the fishing line 20 at a point which is closer to the tip 17 of the fishing rod 12 than the distance from the tip 17 to the flattened end 42 of the spring 23 when the fishing rod 12 is straight.

The operator of the automatic fishing device 10 then pulls downward on the fishing line 20 a sufficient distance to slip the fishing line 20 into the notch 44. The fishing line 20 is then released so the stopper 45 holds the fishing rod 12 in a different angular relationship to the elongated section 40 of the spring 23 through tension in the fishing line 20.

When a fish pulls on the fishing line 20 sufficiently hard for the fishing line 20 to be slid out of the notch 44 and for the stopper 45 to disengage the flattened end 42 of the spring 23, the hook is set in the mouth of the fish and the fisherman is notified of the catch by the shaft 14 of the fishing rod 12 straightening and by the spring 23 moving the fishing rod 12 back to the position which it assumes when there is not tension on the fishing line 20, though continuing tugging on the fishing line 20 by the fish will cause flexing of the shaft 14 and bending of the spring 23 as the automatic fishing device 10 plays the fish.

While the illustrated embodiment is the preferred embodiment persons versed in the art will appreciate that various other configurations and apparatus may be used in the subject automatic fishing device without departing from the spirit of this invention.

What is claimed is:

1. An automatic fishing device comprising, in combination, a support; a fishing rod comprising a handle and a tip; a fishing line secured to said fishing rod and extending from said tip; a spring having elongated first and second ends thereof in a first predetermined angular position therebetween and a resilient section between said spring ends whereby flexing of said resilient section changes said angular position; means for securing said first spring end to said support; means for securing said fishing rod handle to said second spring end; and trigger means for holding said fishing line in tension whereby said fishing rod handle and said second spring end are held against resilient forces of said resilient section in a second predetermined angular position relative to said first spring end and said fishing rod handle and second spring end are released upon pulling of said fishing line so that a pull on said fishing line releases said fishing rod and said second spring end and permits said resilient section to move said second spring end from said second predetermined position to said first predetermined position.

2. An automatic fishing device comprising, in combination, a fishing rod comprising a handle and a tip; a fishing line secured to the fishing rod so as to extend from the tip; a support; spring means for holding said fishing line in a first predetermined position relative to said support and for resiliently forcing said fishing rod to said first predetermined position when said fishing rod is in any other position relative to said support; and trigger means responsive to a pull on said fishing line for holding said fishing rod in a position other than said first predetermined position and for releasing said fishing rod for movement to said first predetermined position when said fishing line is pulled, said trigger means including a notched member secured to said support for receiving said fishing line in the notch therein and a stopper larger than said notch secured to said fishing line whereby said trigger means is set by positioning said fishing rod in a second predetermined position other than said first predetermined position and holding said fishing rod in said second position against the resilient forces of said spring means by passing said fishing line through said notch and holding said fishing line against said resilient forces by securing said stopper to said fishing line adjacent said notch.

3. An automatic fishing device comprising, in combination, a support; a fishing rod having a handle and a tip; a fishing line secured to the fishing rod and extending in a path from the tip in the general direction where fish are to be encountered; a trigger member secured to said support and having a notch near, but not in, the path of the fishing line; spring means for holding the fishing rod in a first predetermined position relative to said support means and for resiliently forcing said fishing rod to said first position when it is not in said first position; and a stopper affixed to said fishing line at a point closer to said tip than said notch, said stopper having at least one dimension larger than the gap across said notch whereby when said fishing line is pulled and placed in said notch with said stopper on the side of said notch opposite the tip said stopper holds said fishing rod in a position other than said first position through tension in said fishing line, a pull on said fishing line by a fish which is of sufficient force to pull said fishing line out of said notch thereby moving said stopper from said notch and permitting said spring means to move said fishing rod to said first position.

4. An automatic fishing device of the type described in claim 3 in which the stopper includes first and second truncated substantially conical members which are substantially concentric and adapted for the passing of the fishing line between said members whereby when said members are pressed together said fishing line is wedged there between and said stopper is rigidly secured to said fishing line.

5. An automatic fishing device of the type described in claim 3 in which the spring means is comprised of a first elongated spring end secured to said support, a second elongated spring end secured to said fishing rod, and a resilient section between said spring ends which holds said spring ends in a predetermined angular position and placement of said fishing rod in a position other than said first predetermined position flexes said resilient section, thereby resiliently forcing said fishing rod towards that first predetermined position.

6. An automatic fishing device of the type described in claim 5 in which said trigger member is comprised of a notch formed in an extension of said first spring end.

7. An automatic fishing device of the type described in claim 6 in which the stopper substantially surrounds said fishing line and is adapted for sliding along said fishing line to an infinite number of points and rigidly secured at any of said infinite number of points.

8. An automatic fishing device of the type described in claim 7 in which said stopper includes first and second concentric members of a truncated substantially conical design between which said fishing line is passed whereby said stopper may be rigidly secured to said fishing line at an infinite number of points by wedging said substantially conical members together so as to squeeze said fishing line there between.

* * * * *